United States Patent
Zou et al.

(10) Patent No.: US 9,565,145 B2
(45) Date of Patent: Feb. 7, 2017

(54) INFORMATION SHARING MANAGEMENT ON AN INSTANT MESSAGING PLATFORM

(71) Applicant: Tencent Technology (Shenzhen) Company Limited, Shenzhen (CN)

(72) Inventors: Jianbo Zou, Shenzhen (CN); Maowei Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/186,127

(22) Filed: Jun. 17, 2016

(65) Prior Publication Data

US 2016/0294744 A1 Oct. 6, 2016

Related U.S. Application Data

(63) Continuation of application No. PCT/CN2015/070250, filed on Jan. 7, 2015.

(30) Foreign Application Priority Data

Jan. 10, 2014 (CN) .......................... 2014 1 0011348

(51) Int. Cl.
*H04L 12/58* (2006.01)
*H04L 29/08* (2006.01)
*H04L 29/06* (2006.01)

(52) U.S. Cl.
CPC ............. *H04L 51/046* (2013.01); *H04L 51/10* (2013.01); *H04L 51/32* (2013.01); *H04L 63/102* (2013.01);
(Continued)

(58) Field of Classification Search
CPC .............................. H04L 51/046; H04L 67/306
(Continued)

(56) References Cited

U.S. PATENT DOCUMENTS 8,935,614 B2 * 1/2015 Alfred .................. H04L 12/588
705/319
8,940,075 B2 1/2015 Hwang et al.
(Continued)

FOREIGN PATENT DOCUMENTS

CN 102413361 A 4/2012
CN 103440241 A 12/2013
(Continued)

OTHER PUBLICATIONS

"Mobile Application Advertising Measurement Guidelines"—IAB MMA MRC, Jul. 2013 https://www.iab.com/wp-content/uploads/2015/06/MobileAppsAdGuidelines1FINAL-1.pdf.*
(Continued)

*Primary Examiner* — Randy Scott
(74) *Attorney, Agent, or Firm* — Morgan, Lewis & Bockius LLP

(57) ABSTRACT

This application discloses a method implemented at a server to control information items shared on an instant messaging platform. The server monitors information sharing activities by a public account of the instant messaging platform. The public account is supported by a third party application authorized by the instant messaging platform and has connection with a plurality of individual user accounts of the instant messaging platform. When the amount of information shared by the public account exceeds a predefined threshold, the server partitions the shared information into multiple categories and measures user activities from the plurality of individual user accounts on the categorized shared information. The server selects a policy of restricting the public account from sharing information with the plurality of individual user accounts based on the measurement result, and applies the policy to the public account.

20 Claims, 7 Drawing Sheets

(52) U.S. Cl.
CPC ............ *H04L 63/108* (2013.01); *H04L 67/20* (2013.01); *H04L 67/22* (2013.01); *H04L 67/306* (2013.01)

(58) Field of Classification Search
USPC ....... 709/204, 205, 206, 223, 224; 705/7.13, 705/7.18, 7.19
See application file for complete search history.

(56) References Cited

U.S. PATENT DOCUMENTS

| | | | |
|---|---|---|---|
| 2005/0171832 A1* | 8/2005 | Hull | G06Q 30/0201 705/7.29 |
| 2011/0138298 A1 | 6/2011 | Alfred et al. | |
| 2013/0325948 A1 | 12/2013 | Chen et al. | |
| 2013/0339358 A1 | 12/2013 | Huibers et al. | |

FOREIGN PATENT DOCUMENTS

| | | |
|---|---|---|
| WO | WO 2011097624 A2 | 8/2011 |
| WO | WO 2012113265 A1 | 8/2012 |
| WO | WO 2012126890 A1 | 9/2012 |

OTHER PUBLICATIONS

Tencent Technology, ISRWO, PCT/CN2015/070250., Apr. 8, 2015, 7 pgs.
Tencent Technology, IPRP, PCT/CN2015/070250, Jul. 12, 2016, 5 pgs.

* cited by examiner

INFORMATION SHARING MANAGEMENT ON AN INSTANT MESSAGING PLATFORM

RELATED APPLICATIONS

This application is a continuation application of PCT Patent Application No. PCT/CN2015/070250, entitled "INFORMATION SHARING MANAGEMENT ON AN INSTANT MESSAGING PLATFORM" filed on Jan. 7, 2015, which claims priority to Chinese Patent Application No. 201410011348.0, entitled "INFORMATION SHARING CONTROL METHOD AND APPARATUS" filed on Jan. 10, 2014, both of which are incorporated by reference in their entirety.

TECHNICAL FIELD

This application relates generally to computer technology, including but not limited to methods and systems for controlling information sharing activities on an open platform, such as a social network application.

BACKGROUND

An open platform provides public programming ports and functions to interface with third party applications, such that the third party applications could expand their functions on the open platform, while not necessarily using resources of the open platform or modifying source codes of the open platform.

One of the primary functions of the open platform is to allow its registered users to share information (e.g., advertisements and promotions) from the third party applications that the users have used. As such, the open platform becomes a good channel for promoting the third party applications as well. For example, when a user who has registered on the open platform uses a third party application to complete a certain task (e.g., a game), the third party application prompts the user to share information related to the third party application on the open platform. The information related to the third party application includes a text message, a website link, a picture, an audio clip and the like. The user's friends who are also registered users would receive the information related to the third party application on the open platform. Therefore, the third party application could use the open platform to deliver and spread promotional information to more users.

Sometimes, the open platform is plagued with large amount of information that is pushed by third party applications without its authorization. This occurs partially because the open platform has allowed its registered users to receive any information items provided by their friends (who are also registered users) as far as these friends have been acknowledged, but not blocked, by the registered users. Without control over the information shared by its registered users, the open platform could waste a large amount of resources to distribute redundant information in a repeated manner. Particularly, the users of the open platform could voluntarily or involuntarily distribute the information related to third party applications that are malicious, and imposes security threats to their friends' user accounts. Therefore, there is a need to control information sharing activities on the open platform for each individual user or third party application associated with the open platform.

SUMMARY

The above deficiencies and other problems associated with the conventional approaches for sharing information on an open platform are reduced or eliminated by the application disclosed below. In some embodiments, the application is implemented in a server system that has one or more processors, memory and one or more modules, programs or sets of instructions stored in the memory for performing multiple functions. Instructions for performing these functions may be included in a computer program product configured for execution by one or more processors.

One aspect of the application is an information control method implemented at a server system having one or more processors and memory storing programs for execution by the processors. The information control method includes monitoring information sharing activities by a public account of a social network platform. The public account is supported by a third-party application authorized by the social network platform and has connection with a plurality of individual user accounts of the social network platform. The method further includes when the amount of information shared by the public account exceeds a predefined threshold, (1) partitioning the shared information into multiple categories, (2) measuring user activities from the plurality of individual user accounts on the categorized shared information, (3) selecting a policy of restricting the public account from sharing information with the plurality of individual user accounts based on the measurement result, and (4) applying the policy to the public account.

Another aspect of the application is a server system that includes one or more processors, and memory having instructions stored thereon, which when executed by the one or more processors cause the processors to perform operations to implement the above method for controlling information items shared on a social network platform.

Another aspect of the application is a non-transitory computer-readable medium, having instructions stored thereon, which when executed by one or more processors cause the processors to perform operations to implement the above methods for controlling information items shared on a social network platform.

Various advantages of the present application would be apparent in light of the descriptions below.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

To describe the technical solutions according to the embodiments of the present application more clearly, the accompanying drawings for describing the embodiments are introduced briefly in the following. Apparently, the accompanying drawings in the following description are only some embodiments of the present application, and persons of ordinary skill in the art can derive other drawings from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application more clearly, the following further describes in detail the technical solutions in the embodiments of the present application with reference to the accompanying drawings.

This application discloses a method implemented on a server system to control information items shared on an open platform (e.g., a social network platform). The server enables various client devices that are communicatively coupled to the server to execute a social network application. The social network application is associated with a plurality of user accounts registered by authorized users, and the authorized users publish and share a plurality of information items on the corresponding social network platform enabled by the social network application. An example of the social network platform is WeChat Application, and information is optionally published and shared on various user interfaces for group conversations, blogs and the like. After establishing the social network platform, the server identifies a subset of information items that are created by a third party application and posted on the social network platform via the plurality of user accounts. Then, the server monitors the number of information items in the subset of information items that are posted on various locations of the social network platform (e.g., the group conversations or the blog pages) within a predetermined period of time. In accordance with a policy associated with the social network platform, the server controls the number of information items that are created by the third party application and published on the social network platform. The above information sharing policy includes a plurality of control scenarios defined according to at least one of information item types, the duration of time, a temporal trend of the number of information items, the identity of the third party application, and the history of the third party platform.

Figure 1:
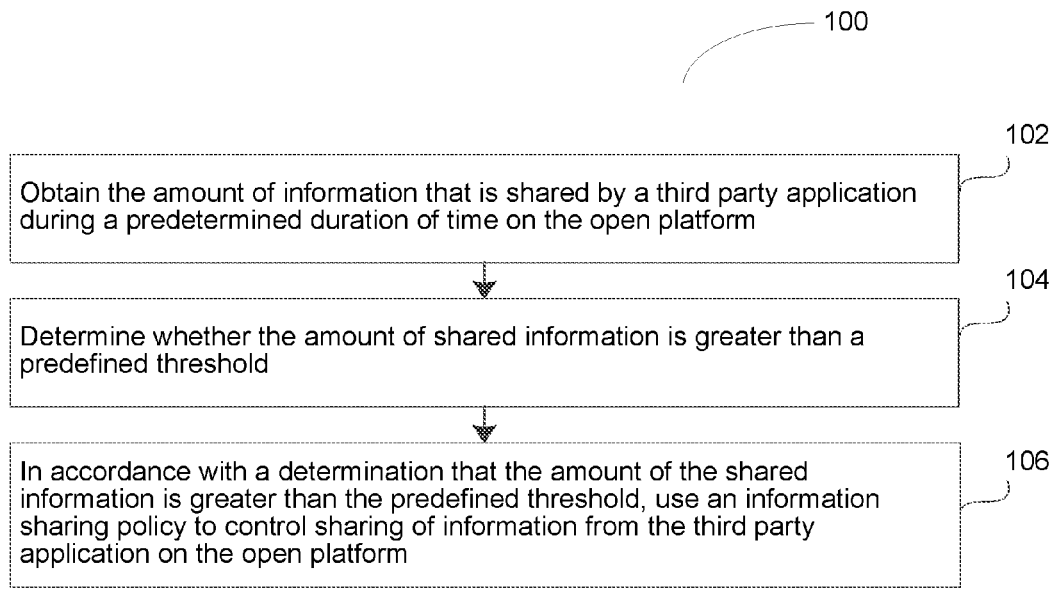
FIG. 1 is a flow chart of an exemplary information control method that controls information shared on an open platform in accordance with some embodiments.

FIG. 1 is a flow chart of an exemplary information control method 100 that controls information shared on an open platform in accordance with some embodiments. Method 100 is, optionally, governed by instructions that are stored in a non-transitory computer readable storage medium and that are executed by one or more processors of a server. Each of the operations shown in FIG. 1 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of source code, assembly language code, object code, or other instruction format that is interpreted by one or more processors. Some operations in method 100 may be combined and/or the order of some operations may be changed.

Information control method 100 is implemented on a server that enables an open platform. In a specific example, the open platform includes a social network platform that optionally includes group conversations and blogs associated with its registered users. The open platform application is installed and operates on a plurality of client devices. The server obtains (102) the amount of information that is shared on the open platform by a third party application during a predetermined duration of time. The server then determines (104) whether the amount of shared information is greater than a predefined threshold. In accordance with a determination that the amount of the shared information is greater than the predefined threshold, the server uses (106) an information sharing policy to control sharing of information on the open platform by the third party application.

In accordance with various embodiments of information control method 100, the server obtains the amount of information shared on an open platform by a third party application in a predetermined period of time. When it is determined that the amount of the information is greater than a predefined threshold, the third party application is subject to an information sharing policy that controls the information shared on the open platform by the third party applications. In comparison, the prior art solutions allow the open platform to receive and display the information pushed by third party applications to their registered users without limitations, which wastes large amount of computational resource and causes security threats to related user accounts. As such, information control method 100 is implemented to control the information shared by each third party application on the open platform dynamically, thereby conserving computational resources and deterring security threats effectively.

It should be understood that the particular order in which the operations in FIG. 1 have been described are merely exemplary and are not intended to indicate that the described order is the only order in which the operations could be performed. One of ordinary skill in the art would recognize various ways to control information shared on an open platform as described herein. Additionally, it should be noted that details of other processes described herein with respect to methods 200 and 600 (e.g., FIGS. 2 and 6) are also applicable in an analogous manner to method 1100 described above with respect to FIG. 1. For brevity, these details are not repeated here.

Figure 2:
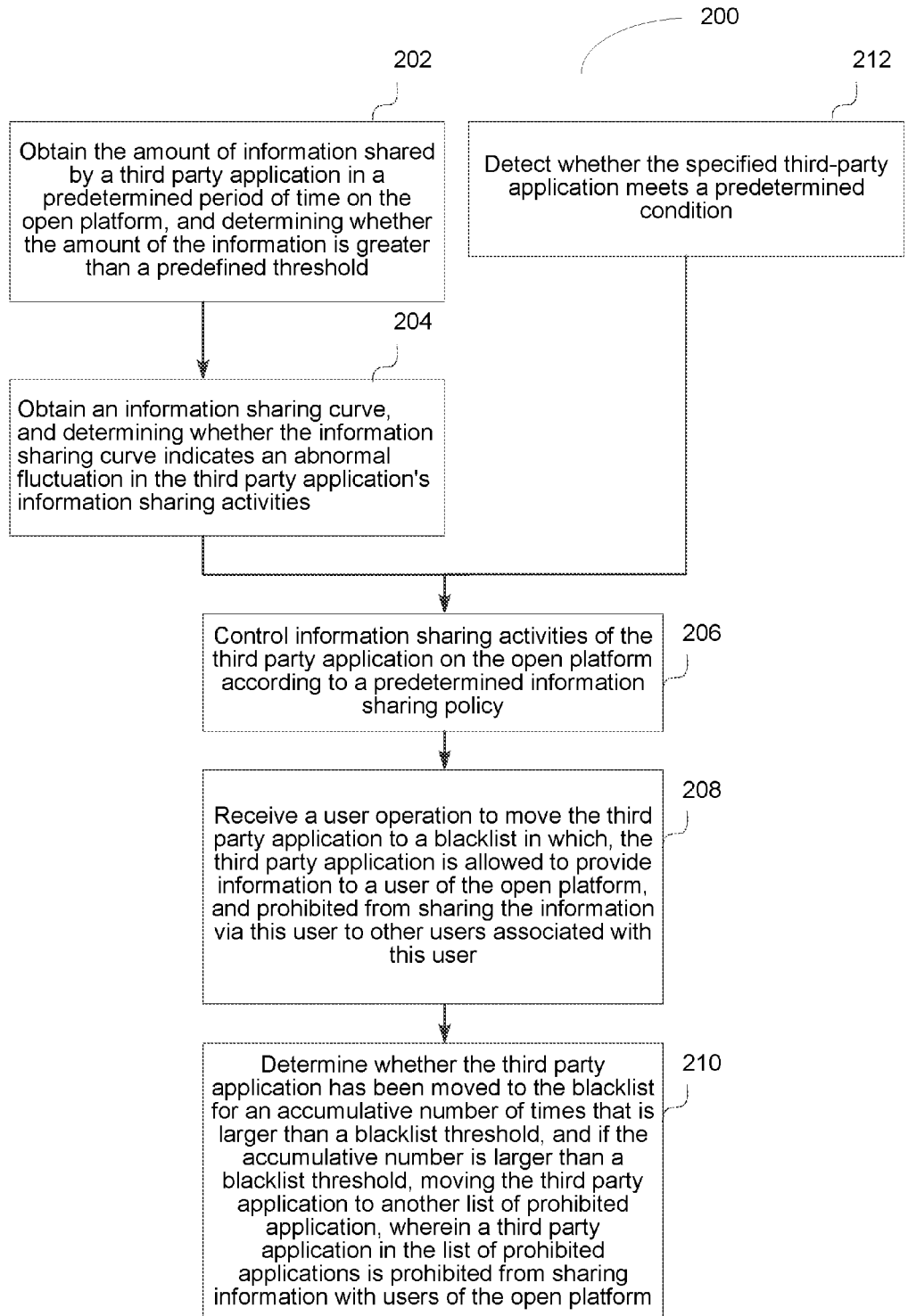
FIG. 2 is a flow chart of another exemplary information control method that controls information shared on an open platform in accordance with some embodiments.

FIG. 2 is a flow chart of another exemplary information control method 200 that controls information shared on an open platform in accordance with some embodiments. Method 200 is, optionally, governed by instructions that are stored in a non-transitory computer readable storage medium and that are executed by one or more processors of a server. Each of the operations shown in FIG. 2 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

Information control method 200 is implemented to control information sharing activities of a third party application on the open platform. The open application is installed on a plurality of client devices that are communicatively coupled to the server that facilitates operation of the open application. Specifically, the server obtains (202) the amount of information shared on the open platform by a third party application in a predetermined period of time, and determines whether the amount of the information is greater than a predefined threshold.

As explained above, in some embodiments, the open platform includes a social network platform. When a user of the social network application uses a third party application, the third party application prompts the user to determine whether information relevant to the third party application is shared to the social network platform. If the user selects yes, the third party application invokes a relevant application program interface to share the information via the user's user account on the social network platform. The open platform displays an identifier of the third party application and an information item representing the information shared by the third party application, e.g., a website, a picture, a video clip or an audio clip.

In some embodiments, the predetermined period of time lasts from 12 AM on a day to a current time. Stated another way, when the server determines that the amount of the information shared by the third party application on that day reaches the predefined threshold, information sharing activities of the third party application are controlled thereafter on the social network platform. As such, the third party application is prohibited from maliciously sharing information, wasting computational resources and/or threatening the security of the user accounts that operate on the social network platform.

In some embodiments, the server determines whether the amount of the information shared by the third party application on that day reaches the predefined threshold according to the content types of the information shared by the third party application. For example, the third party application shares a plurality of websites on the social network platform during the predetermined period of time, and it is determined whether the number of websites shared by the third party application is greater than a first threshold. In some situations, the third party application shares a plurality of pictures on the social network platform during the predetermined period of time, and it is determined whether the number of pictures shared by the third party application is greater than a second threshold, in some situations, the third party application shares a plurality of audio clips on the social network platform during the predetermined period of time, and it is determined whether the number of audio clips shared by the third party application is greater than a third threshold.

Specifically, in some embodiments, the server sets thresholds separately according to the content type of the shared information. In an example, the first and second thresholds are set to be 1000 for websites and pictures shared by the third party application within the predetermined period of time, and the third threshold is set to be 5000 for audio clips shared by the third party. The server determines whether the third party application has shared more than 1000 website links on the open platform on that day, whether the third party application has shared more than 1000 pictures on the open platform on that day, or Whether the third party application has shared more than 5000 audio clips on the open platform on that day. If the information shared by the third party application exceeds 1000 websites, 1000 pictures or 5000 audio clips on that day, the server therefore determines that the amount of the information shared by the third party application on that day is greater than the predefined threshold.

In some embodiments, after obtaining the amount of information shared by the third party application, the server further obtains (204) an information sharing curve associated with the third party application's information sharing activities on the open platform, and determines whether the information sharing curve indicates an abnormal fluctuation in the third party application's information sharing activities. The information sharing curve records the amount of information shared by the third party application during a plurality of shorter periods of time within the day (e.g., every 20 minutes).

In some embodiments, the third party application is updated to a new version, and therefore, the amount of the information shared by the third party application could increase temporarily. Specifically, when a new function is added in the new version of the third party application, it could be popular among users and lead to the increase of the amount of the information shared from this new version of the third party application. This increase could cause the amount of the shared information to exceed the predefined threshold. However, such information sharing is not, nor should it be identified as malicious sharing.

In some implementation, to avoid accidental identification of the foregoing situation as malicious information sharing, the server determines whether the amount of the information shared by the third party application on the open platform exceeds the predefined threshold, and subsequently creates the information sharing curve of the third party application to determine whether the information sharing curve abnormally fluctuates in the predetermined period of time. As such, if the shared information of the third party application booms in the predetermined period of time, and the third party application has released a new version in the predetermined period of time, it is determined that the increase of the shared information from the third party application is caused by version update instead of malicious sharing. If the third party application has not released a new version recently in the predetermined period of time, it is determined that the increase of the shared information from the third party application is caused by malicious sharing.

In an example, the server checks the amount of information shared by the third party application on the open platform every 24 hours, (i.e., the predetermined period of time includes 24 hours). During each 24 hour period of time, the server records the amount of the information shared by the third party application in various shorter periods of time (e.g., every one hour). The information sharing curve plots the amount of the shared information within the shorter periods of time versus the corresponding time. Therefore, the server plots the amount of the shared information as points on the information sharing curve, and connects the points in a temporal order. To determine whether the information sharing curve has any abnormal fluctuation, the server calculates an average value of the amount of the information shared by the third party application for each period of time, and a difference between the average value and the amount of information shared by the third party application on that day. When the difference is greater than a preset value, it is considered that the information sharing curve fluctuates abnormally.

Alternatively, in some embodiments, the server does not obtain the information sharing curve as in operation 204. Rather, after determining that the amount of the shared information is greater than the predefined threshold at step 202, the server controls (206) information sharing activities of the third party application on the open platform according to a predetermined information sharing policy.

Further, in some embodiments, when it is determined that the third party application maliciously shares information on the open platform, the server adds the third party application into a grey list associated with the platform, and in accordance with the predetermined information sharing policy, controls the information sharing activities of the third party application added into the grey list. In a specific example, the server controls the number of messages shared by the third party application based on a predetermined threshold for message that is allowed to be shared from the third party application every day. Specifically, in one situation, the messages are counted if they are shared by the third party to less than N users (where N is a positive integer). In another situation, the messages are counted, when they are shared by the third party application to a specific user account (e.g., a first user account) and optionally shared via another specific user account (e.g., a second user account). In this example, the number of messages is controlled less than M, where M is a positive integer.

For example, the open platform requires that each user receives messages shared by the third party application from five or less other users every day, and that each of the five or less other users be allowed to push to the respective user less than three messages associated with the third party application each day.

In some embodiments, the server receives (208) a user operation to move the third party application to a blacklist. When the third party application is a blacklist application associated with the open platform, it is allowed to provide information to a user of the open platform, and however, prohibited from sharing the information via this user to other users associated with this user (e.g., "friends" of the users in WeChat).

Specifically, under some circumstances, after the open platform adds the third party application into the grey list, an alarm may be given to an administrator of the open platform, and the administrator determines whether the third party application has maliciously shared or could maliciously share information. If the administrator determines that the third party application has maliciously shared or could maliciously share information on the open platform, the administrator could choose to move, in a control interface, the third party application from the grey list to the blacklist.

Then, the server determines (210) whether the third party application has been moved to the blacklist for an accumulative number of times that is larger than a blacklist threshold. If the accumulative number is larger than a blacklist threshold, the server moves the third party application to another list of prohibited application, and prohibits the third party application in the list of prohibited applications from sharing information with any users of the open platform. As such, the open platform includes a list of prohibited applications, and for a third party application moved to the list of prohibited applications, the open platform forbids the third party application to interface with the open platform, so as to prevent the third party application from sharing information on the open platform.

In a specific example, for a third party application moved to the blacklist, the open platform determines whether the third party application has been moved by the administrator to the blacklist for three or more times, and if yes, the open platform automatically moves the third party application to the list of prohibited applications to prohibit the third party application from sharing information on the open platform.

In some implementations, prior to applying the information sharing policy as in step 206, the server also determines whether the third party application satisfies a predetermined condition. Specifically, in addition to monitoring the amount of the shared information in view of the predetermined threshold and monitoring the information sharing curve as in steps 202 and 206, the server optionally monitors the information sharing activities of the third party application on the open platform according to the predetermined condition. The predetermined condition is selected from a group of conditions as follows:

(1) In accordance with a first exemplary predetermined condition, the third party application is in a secondary monitoring list, and shares information of no less than a fourth threshold shared on the open platform within the predetermined period of time. For some popular third party applications, the amount of information shared by these third party applications could be large, and a universal predefined threshold is not applicable to these third party applications. Thus, different thresholds may be set for these third party applications.

Specifically, in some embodiments, the open platform includes two monitoring lists, i.e., a default monitoring list and a secondary monitoring list. For a third party application in the default monitoring list, the open platform determines according to the predefined threshold in step 202 and step 204. For a third party application in the secondary monitoring list, the open platform determines according to the fourth threshold that is distinct from the predefined threshold. In a specific example, a third party application is included in the secondary monitoring list, and the fourth threshold is set to be 100,000 for this third party application. When the number of information items shared by the third party application on one day exceeds 100,000, the server determines whether the third party application has been moved to the blacklist as in step 210.

(2) In accordance with a second exemplary predetermined condition, the server determines that the number of information items shared on the open platform by the third party application is no less than a fifth threshold within the predetermined period of time. Some third party applications have few users; for example, some third party applications are only popular in a limited region. The predefined threshold in step 202 is too large for such third party applications, and could be associated with some malicious information sharing activities. Stated another way, when the third party applications with fewer users maliciously share information, the amount of information shared on that day may still not reach the predefined threshold as defined in step 202. Therefore, information sharing behaviors of such third party applications cannot be controlled according to step 202. In this case, the server determines whether the third party application has shared, on the open platform and within the predetermined period of time, more than n pieces of information items that is no less than the fifth threshold. If yes, it is determined that the third party application shares information maliciously on this open platform.

For example, when the server determines that for more than 100 users of the open platform, each has received, on that day, more than 20 information items from the third party application, it determines that the third party application maliciously shares information within a short circle of users, and that the third party application needs to be moved to the blacklist as in step 208.

(3) In accordance with a third exemplary predetermined condition, the third party application number is reported for its malicious information sharing behaviors for a number of report times, and this number of report times is not less than a sixth threshold. The open platform provides a reporting function that allows a user to report any malicious information sharing behaviors or any illegal content publication by the third party application. When the open platform determines that the number of times for which the third party application is reported for malicious information sharing is not less than a certain numerical value, it is determined that the third party application has maliciously shared information or that information, shared by the third party application involves illegal content, and the server further receives a user operation to move the third party application to the blacklist as in step 208.

(4) In accordance with a fourth exemplary predetermined condition, the users of the open platform respond to the information items shared by the third party application, and the average number of the user responses for the information items shared by the third party application is not more than a seventh threshold. For example, a user responds to the information shared by the third party application by clicking "Like" or posting a comment. When the open platform determines that the average number of responses to information shared by the third party application is less than a certain predetermined numerical value (i.e., a seventh threshold), it determines that the third party application is not popular among the users of the open platform, and that the information sharing behaviors of the third party application need to be controlled. For example, the server further receives a user operation to move the third party application to the blacklist as in step 208.

(5) The server also monitors an average execution number, e.g., a ratio between the number of times for which the shared information items are clicked and the number of the information items shared by the third party application on the open platform. In accordance with a fifth exemplary predetermined condition, the ratio is not more than an eighth threshold.

When receiving an information item shared by a third party application, a user optionally clicks on the shared information item to execute the third party application. The click on the shared information is recorded by the server in association with the third party application. Further, in an example, when the open platform determines that a ratio of the number of times for which the third party application is clicked to the number of information items shared by the third party application is less than a certain predetermined numerical value (e.g., the eighth threshold), it determines that the third party application is not popular among the users of the open platform, and that the information sharing behaviors of the third party application need to be controlled. For example, the server further receives a user operation to move the third party application to the blacklist as in step 208.

In some embodiments, the open platform includes a white list, a secondary monitoring list, a default monitoring list, a grey list, a blacklist, and a list of prohibited applications. A third party application in the white list is an application completely trusted by the open platform. A third party application in the secondary monitoring list is a popular application that shares a large number of information items on the open platform. A third party application in the default, monitoring list is a regular application. In some situations, an administrator manually moves a third party application among the above lists, e.g., from the default monitoring list to the secondary monitoring list.

In some embodiments, the open platform monitors the third party applications in the default monitoring list and the secondary monitoring list according to the type (or category) of the shared information. For example, the open platform determines that the shared information item includes website links, pictures or audio clips all shared by the third party application in the default monitoring list on that day. When it is determined that the number of the shared website links is greater than 1000, the number of the shared pictures is greater than 1000, or the number of the shared audio clips is greater than 5000, the open platform sends a warning message to the administrator and automatically moves the third party application to the grey list. In another example, when the open platform determines that the total number of information items shared by a third party application in the secondary monitoring list on that day is greater than 100, 000, the open platform sends a warning message to the administrator and automatically moves the third party application to the grey list. In some implementations, after observing an alarm of the open platform, an administrator determines whether the reported third party application in the grey list maliciously shares information, if it is so determined, the administrator manually moves the third party application to the blacklist, and otherwise, cancels the warning message. Moreover, the open platform further tracks an accumulative number of times for which the third party application has been manually moved to the blacklist, and determines whether the accumulative number reaches 3. If the open platform determines that the accumulative number is equal to or larger than 3, the server automatically moves the third party application to the list of prohibited applications.

As such, in accordance with various embodiments of the information sharing control method disclosed in this application, the server obtains the amount of information shared by a third party application in a predetermined period of time. When it is determined that the amount of the information is greater than a predefined threshold, the server controls the information sharing behaviors of the third party application on the open platform according to a predefined information sharing policy. In comparison, the prior art solutions allow the open platform to receive and display the information pushed by third party applications to their registered users without limitations, which wastes large amount of computational resource and causes security threats to related user accounts. As such, information control method 100 is implemented to control the information shared by each third party application on the open platform dynamically, thereby conserving computational resources and deterring security threats effectively.

Further, in some implementations of the present application, the server obtains an information sharing curve associated with the information sharing behaviors of the third party application. When it is determined that the information sharing curve abnormally fluctuates in the predetermined period of time, the server controls the information sharing behaviors of the third party application on the open platform according to a predefined information sharing policy, thereby avoiding to confuse any accidental information sharing increase caused by software update with malicious information sharing.

Further, in some implementations of the present application, it is determined whether the third party application meets a predetermined condition. When it is determined that the third party application meets the predetermine condition, the server controls the information sharing behaviors of the third party application on the open platform according to a predefined information sharing policy, thereby expanding the application and improving the effect of the information sharing control methods disclosed herein.

It should be understood that the particular order in which the operations in FIG. 2 have been described are merely exemplary and are not intended to indicate that the described order is the only order in which the operations could be performed. One of ordinary skill in the art would recognize various ways to control information shared on an open platform as described herein. Additionally, it should be noted that details of other processes described herein with respect to methods 100 and 600 (e.g., FIGS. 1 and 6) are also applicable in an analogous manner to method 200 described above with respect to FIG. 2. For brevity, these details are not repeated here.

Figure 3:
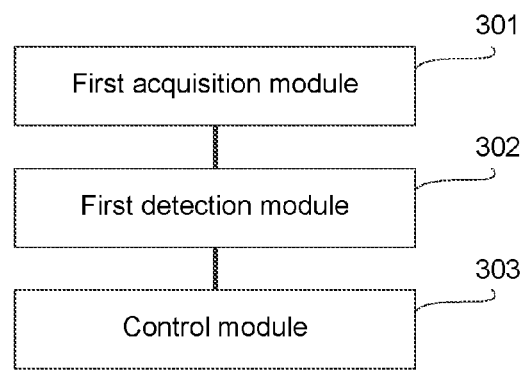
FIG. 3 is a block diagram of an information control system that controls information shared on an open platform in accordance with some embodiments.

FIG. 3 is a block diagram of an information control system that controls information shared on an open platform in accordance with some embodiments. Information control system 300 is implemented at a server that manages an open platform (e.g., a social network platform). A specific example of the open platform is the WeChat application provided by Tencent. Information control system 300 includes, but is not limited to, the following modules:

a first acquisition module 301 that is used to obtain the amount of information shared on the open platform by a third party application within a predetermined period of time;

a first determination module 302 that is used to determine whether the amount of the information obtained by the first acquisition module 301 is greater than a predefined threshold; and a control module 303 that is used to: if module 302 determines that the amount of the information is greater than the predefined threshold, control information sharing behaviors of the third party application on the open platform according to a predefined policy.

Therefore, in accordance with various embodiments of information control system 300, the server obtains the amount of information shared on an open platform by a third party application in a predetermined period of time. When it is determined that the amount of the information is greater than a predefined threshold, the third party application is subject to a predetermined control policy that controls the information shared on the open platform by the third party applications. In comparison, the prior art solutions allow the open platform to receive and display the information pushed by third party applications to their registered users without limitations, which wastes large amount of computational resource and causes security threats to related user accounts. As such, information control system 300 is implemented to control the information shared by each third party application on the open platform dynamically, thereby conserving computational resources and deterring security threats effectively.

Figure 4:
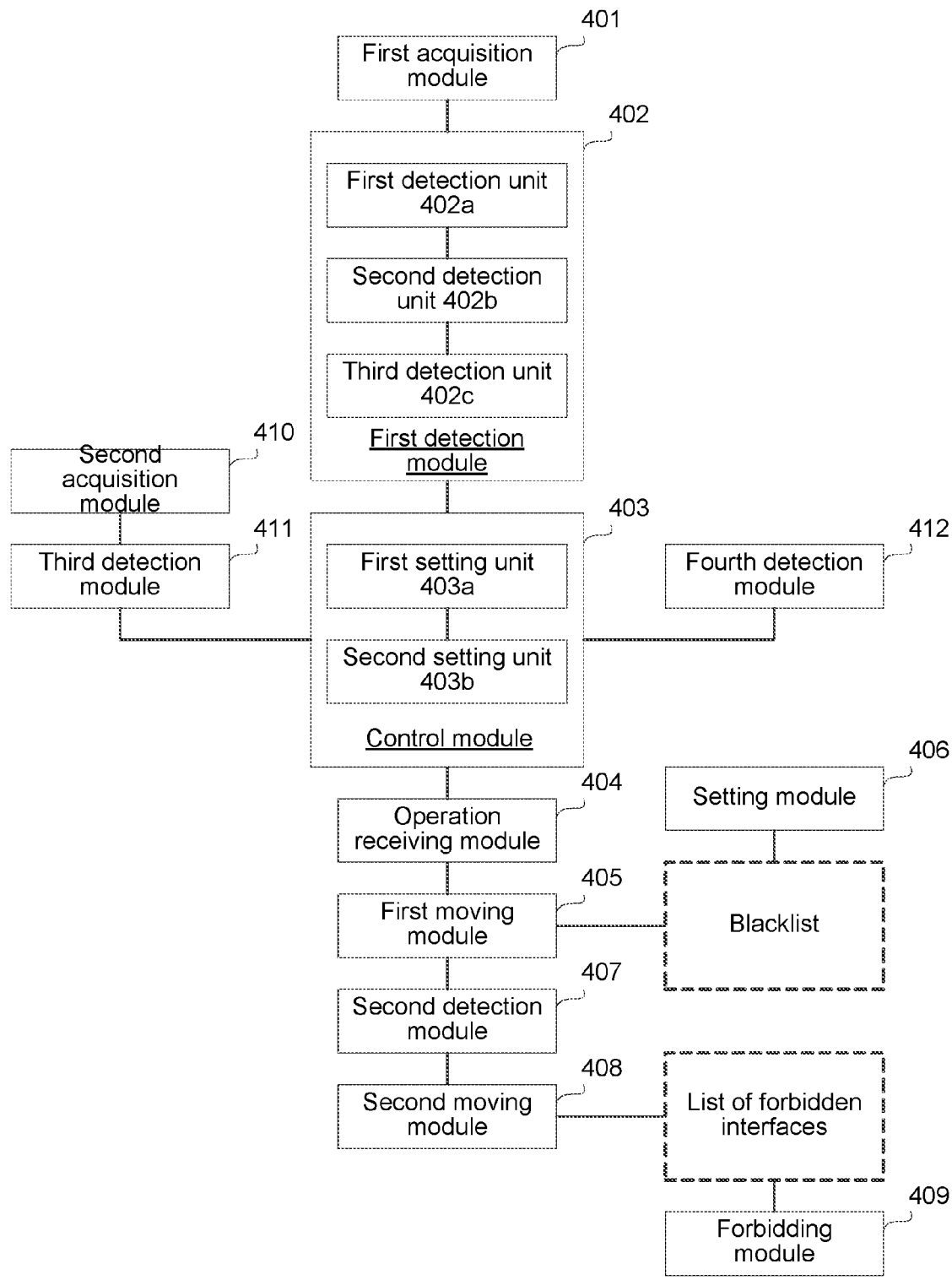
FIG. 4 is a block diagram of another information control system that controls information shared on an open platform in accordance with some embodiments.

FIG. 4 is a block diagram of another information control system 400 that controls information shared on an open platform in accordance with some embodiments. Information control system 400 is implemented to control information sharing behaviors of the third party application on the open platform. Information control system 400 includes, but is not limited to, the following modules:

a first acquisition module 401 that is used to obtain the amount of information shared on the open platform by a third party application within a predetermined period of time;

a first determination module 402 that is used to determine whether the amount of the information obtained by the first acquisition module 301 is greater than a predefined threshold; and a control module 403 that is used to control information sharing behaviors of the third party application on the open platform according to a predefined policy when module 402 determines that the amount of the information is greater than the predefined threshold.

In some implementations, control module 403 includes:

a first setting unit 403a that is used to control that the third party application shares information to each registered user of the open platform via no more than N users of the open platform, where N is an integer; and a second setting unit 403b that is used to control that the third party application shares no more than M information items, where N is an integer, via each registered user.

In some implementations, first determination module 402 includes:

a first determination unit 402a that is used for when the third party application shares website links on the open platform, determining whether the number of website links shared by the third party application in the predetermined period of time is greater than a first threshold;

a second determination unit 402b that is used for when the third party application shares pictures on the open platform, determining whether the number of pictures shared by the third party application in the predetermined period of time is greater than a second threshold; and a third determination unit 402c that is used for when the third party application shares audio clips on the open platform, determining whether the number of audio clips shared by the third party application in the predetermined period of time is greater than a third threshold.

In some implementations, information control system 400 further includes:

an operation receiving module 404 that is used to receive a moving operation associated with the third party application after control module 403 controls information sharing behaviors of the third party application according to the predefined policy;

a first moving module 405 that is used to move the third party application to a blacklist; and a setting module 406 that is used to control the information shared by a third party application in the blacklist on the open platform to be visible to a specific user who has implemented an operation on the third party application, but not visible to other users via this specific user.

In some implementations, information control system 400 further includes:

- a second determination module 407 that is used to determine whether an accumulative number of times for which the third party application has been moved to the blacklist reaches a blacklist threshold (e.g., 3 times);
- a second moving module 408 that is used to move the third party application to a list of prohibited applications when it is determined that the third party application has been moved to the blacklist for an accumulative number of times that is equal to or greater than the blacklist threshold; and
- a forbidding module 409 that is used to prohibit a third party application in the list of prohibited applications to share information to any registered user on the open platform.

In some implementations, information control system 400 further includes:

- a second acquisition module 410 that is used to obtain an information sharing curve associated with the third party application's information sharing activities on the open platform, before the control module 403 control the information sharing behaviors of the third party application on the open platform according to the predefined policy, where the information sharing curve records the amount of information shared by the third party application during a plurality of short periods of time within the predetermined period of time (e.g., within a day); and
- a third determination module 411 that is used to determine whether the information sharing curve indicates an abnormal fluctuation in the third party application's information sharing activity.

In this situation, control module 403 is used to control information sharing behaviors of the third party application on the open platform according to a predefined policy, when it is determined that the information sharing curve indicates an abnormal fluctuation in the third party application's information sharing activities on the open platform.

In some implementations, information control system 400 further includes a fourth determination module 412 that is used to determine whether the third party application meets a predetermined condition. In this situation, control module 403 is used to control information sharing behaviors of the third party application on the open platform according to a predefined policy when fourth determination module 412 determines that the third party application meets the predetermined condition. The predetermined condition includes at least one of the following conditions:

- a first condition in which when the third party application is in a secondary monitoring list, the amount of the information shared by the third party application in the predetermined period of time on the open platform is not less than a fourth threshold;
- a second condition in which the number of users who receives more than n information items from the third party application within the predetermined period of time is not less than a fifth threshold, where n is a positive integer;
- a third condition in which the number of times for which the third party application is reported for inappropriate information sharing activities is not less than a sixth threshold;
- a fourth condition in which an average number of user responses for the information items shared by the third party application is not more than a seventh threshold; and
- a fifth condition in which a ratio between the number of times for which the shared information items are clicked and the number of the information items shared by the third party application on the open platform is not more than an eighth threshold.

Therefore, in accordance with various embodiments of information control system 300, the server obtains the amount of information shared on an open platform by a third party application in a predetermined period of time. When it is determined that the amount of the information is greater than a predefined threshold, the third party application is subject to a predetermined control policy that controls the information shared on the open platform by the third party applications. In comparison, the prior art solutions allow the open platform to receive and display the information pushed by third party applications to their registered users without limitations, which wastes large amount of computational resource and causes security threats to related user accounts. As such, information control system 300 is implemented to control the information shared by each third party application on the open platform dynamically, thereby conserving computational resources and deterring security threats effectively.

Further, in some implementations of the present application, the server obtains an information sharing curve associated with the information sharing behaviors of the third party application. When it is determined that the information sharing curve abnormally fluctuates in the predetermined period of time, the server controls the information sharing behaviors of the third party application on the open platform according to a predefined information sharing policy, thereby avoiding to confuse accidental information sharing increases caused by software update with malicious information sharing.

Further, in some implementations of the present application, it is determined whether the third party application meets a predetermined condition. When it is determined that the third party application meets the predetermine condition, the server controls the information sharing behaviors of the third party application on the open platform according to a predefined information sharing policy, thereby expanding the application and improving the effect of the information sharing control methods disclosed herein.

It should be noted that, when information control system 400 provided in the embodiment controls information shared by a third party application, description is only made by using division of the foregoing functional modules as an example, and in a practical application, the functions may be distributed to be implemented by different functional modules as required, that is, an internal structure of the apparatus is divided into different functional modules, so as to implement all or part of functions described above. In addition, information control system 300 provided in the foregoing embodiment and the information sharing control method embodiment belong to the same concept; and for a specific implementation process, refer to the method embodiments, which is not described herein again.

Figure 5:
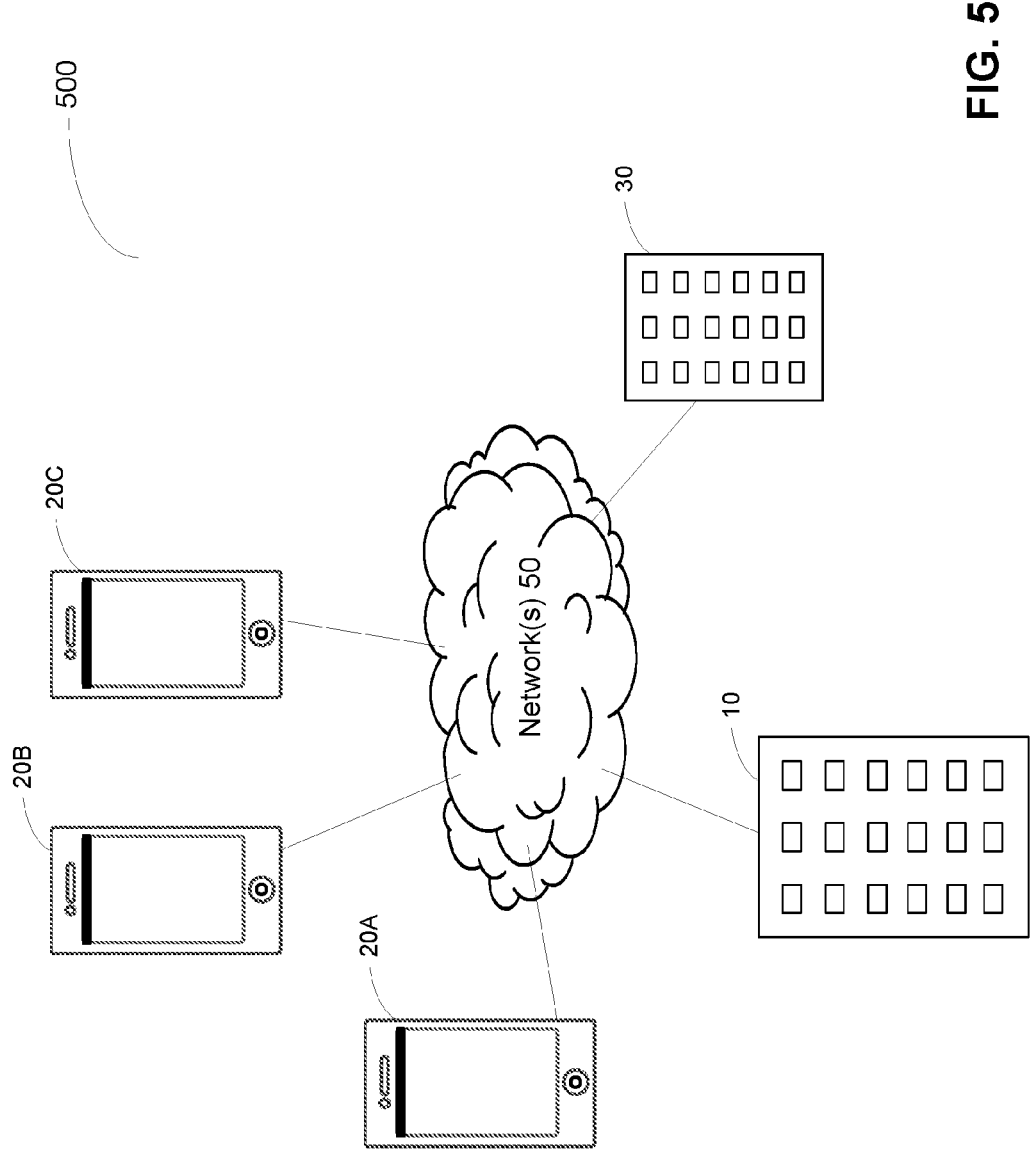
FIG. 5 is an exemplary open platform environment that allows a plurality of users to receive and share information from third party application servers in accordance with some embodiments.

FIG. 5 is an exemplary open platform environment 500 that allows a plurality of users to receive and share information from third party application servers in accordance with some embodiments. An example of the open platform environment is an environment associated with a social network application in which registered users communicate with each other via blogging, private conversations or public conversations.

Open platform environment 500 includes a server system 10, a plurality of client devices 20, one or more third party application servers 30, and one or more communication networks that communicatively couple server system 10, client devices 20 and third party application servers 30. Server system 10 manages an open platform application that is installed on client devices 20 and provides service to the users associated with client devices 20. Each third party application server 30 manages another third party application that is integrated in the open platform application, and the users of client devices 20 are allowed to access the third party application while they log onto their accounts on the open platform on their client devices 20. In various embodiments of the present application, information shared by one or more third party applications is managed by server system 10 that manages the open platform application.

The communication network(s) used can be one or more networks 50 having one or more type of topologies, including but not limited to the Internet, intranets, local area networks (LANs), cellular networks, Ethernet, Storage Area Networks (SANs), telephone networks, Bluetooth personal area networks (PAN) and the like. In some embodiments, two or more machines 102 in a sub-network are coupled via a wired connection, while at least some of machines in the same sub-network are coupled via a Bluetooth PAN.

Figure 6:
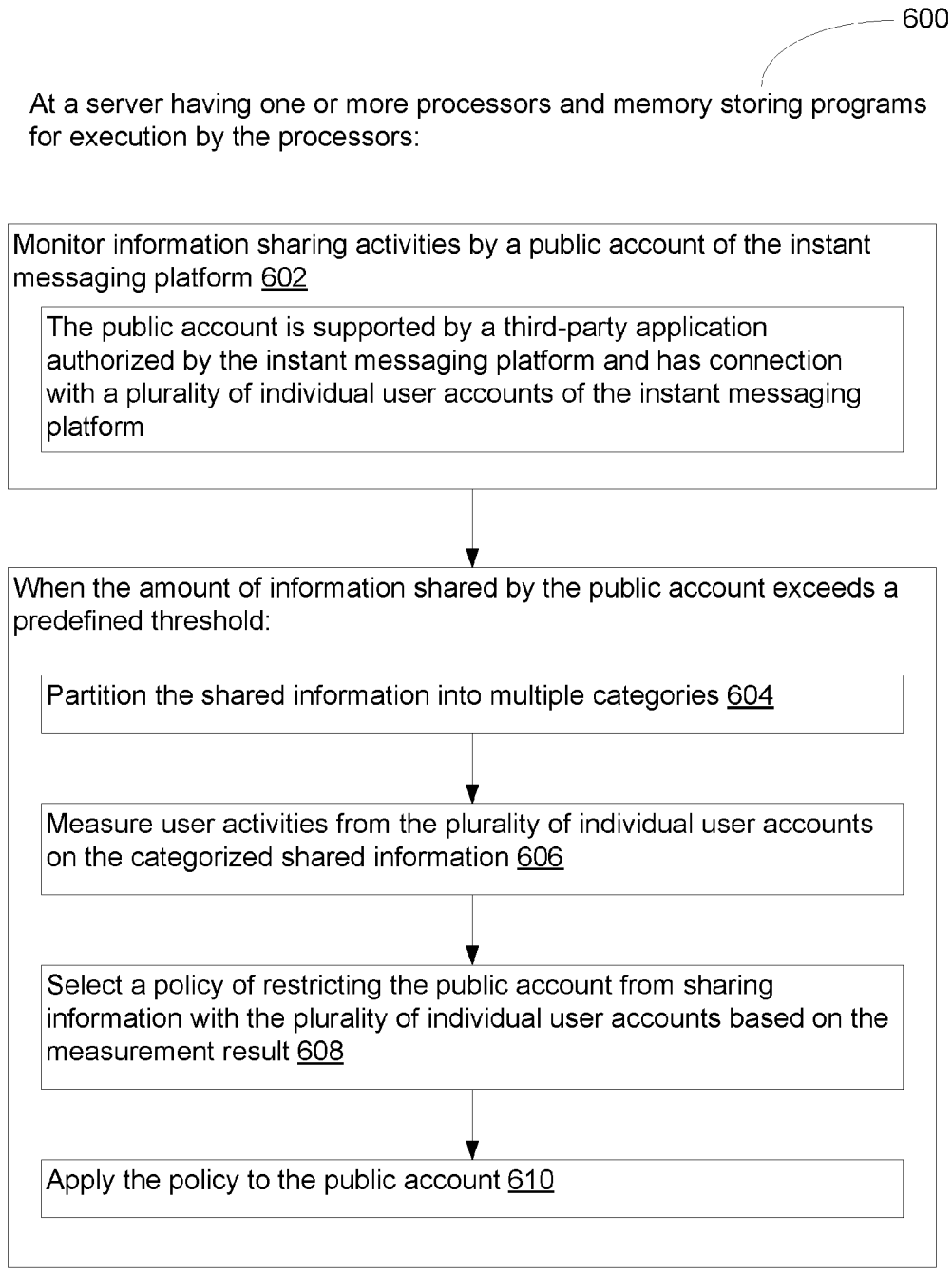
FIG. 6 is a flow chart of an exemplary information control method that controls information shared on a social network platform in accordance with some embodiments.

FIG. 6 is a flow chart 600 of an exemplary information control method that controls information shared on a social network platform in accordance with some embodiments. Method 600 is, optionally, governed by instructions that are stored in a nom transitory computer readable storage medium and that are executed by one or more processors of a server. Each of the operations shown in FIG. 6 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 600 may be combined and/or the order of some operations may be changed.

In various embodiments of information control method 600, the server monitors (602) information sharing activities by a public account of the social network platform, and the public account is supported by a third-party application authorized by the social network platform and has connection with a plurality of individual user accounts of the social network platform. When the amount of information shared by the public account within a predetermined period of time exceeds a predefined threshold, the server partitions (604) the shared information into multiple categories (e.g., audio clips, website links, pictures and video clips). Then, the server measures (606) user activities from the plurality of individual user accounts on the categorized shared information, selects (608) a policy of restricting the public, account from sharing information with the plurality of individual user accounts based on the measurement result, and applies (610) the policy to the public account.

An example of the social network platform is WeChat Application provided by Tencent. In some embodiments, the social network platform includes an instant messaging application. In some embodiments, the third party application is selected from a survey program, a game, a news service program, a music application, a customer service application, and an online shopping application.

In some embodiments, the social network platform includes a group conversation that engages a subset of individual user accounts, and the third party application shares information on the group conversation via at least a first user account in the subset of individual user accounts. In some embodiments, the social network platform includes a blog associated with each individual user account, and the third party application shares information on a first blog via a corresponding user account or another user account owned by one of the blog owner's friends who has commented on the respective blog.

In some embodiments, the predefined threshold is defined according to one or more of the type of the shared information, the duration of time, a temporal trend of the amount of shared information, the type of the third party application, and the history of the third party application.

In some embodiments, the predefined threshold includes a first threshold, a second threshold and a third threshold that are associated with a website information category, a picture information category and an audio clip information category, respectively.

In some embodiments, the server obtains an information sharing curve that plots the amount of information shared by the public, account at a plurality of shorter periods of time within the predetermined period of time. Further, the server determines whether the information sharing curve indicates an abnormal fluctuation in the third party application's information sharing activity. The policy of restricting the public account is selected and applied when the information sharing curve does not indicate any abnormal fluctuation in the third party application's information sharing activity. Further, in some embodiments, the server determines whether the third party application has released a new version in the predetermined period of time, and it is determined that the information sharing curve does not indicate an abnormal fluctuation in the third party application's information sharing activity when the third party application has released a new version in the predetermined period of time.

In some embodiments, the amount of shared information is monitored for a first user account on the social network platform, and the information is shared by the third party application to the first user via a second user account.

In some embodiments, the policy is applied to the public account further in accordance with a determination that at least one of the predetermined conditions is satisfied, and the predetermined conditions include:
  a first condition in which when the third party application is in a secondary monitoring list, the amount of the information shared by the third party application in the predetermined period of time on the open platform is not less than a fourth threshold that is distinct from the predefined threshold;
  a second condition in which the number of users who receives more than n information items from the third party application within the predetermined period of time is not less than a fifth threshold, where n is a positive integer;
  a third condition in which the number of times for which the third party application is reported for inappropriate information sharing activities is not less than a sixth threshold;
  a fourth condition in which an average number of user responses for the information items shared by the third party application is not more than a seventh threshold; and
  a fifth condition in which a ratio between the number of times for which the shared information items are clicked and the number of the information items shared by the third party application on the social network platform is not more than an eighth threshold.

In some embodiments, in accordance with the policy, the third party application is moved to a blacklist, and controlled to share information to a user who has implemented an operation on the third party application, but not to other users via this user.

In some embodiments, in accordance with the policy, the third party application is moved to a list of prohibited applications when it is determined that the third party application has been moved to the blacklist for an accumulative number of times that is equal to or greater than a blacklist threshold, and the third party application is prohibited from sharing information with any registered user on the social network application.

It should be understood that the particular order in which the operations in FIG. 6 have been described are merely exemplary and are not intended to indicate that the described order is the only order in which the operations could be performed. One of ordinary skill in the art would recognize various ways to control information shared on an open platform as described herein. Additionally, it should be noted that details of other processes described herein with respect to methods 100 and 200 (e.g., FIGS. 1 and 2) are also applicable in an analogous manner to method 600 described above with respect to FIG. 6. For brevity, these details are not repeated here.

Figure 7B:
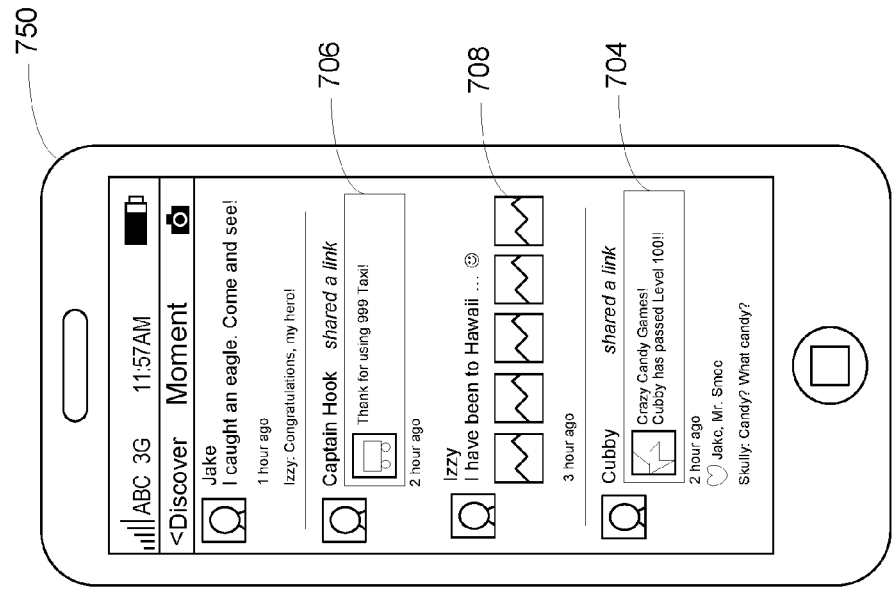
FIGS. 7A and 7B are two exemplary user interfaces of a social network platform on which third party applications push information in accordance with some embodiments.
Figure 7A:
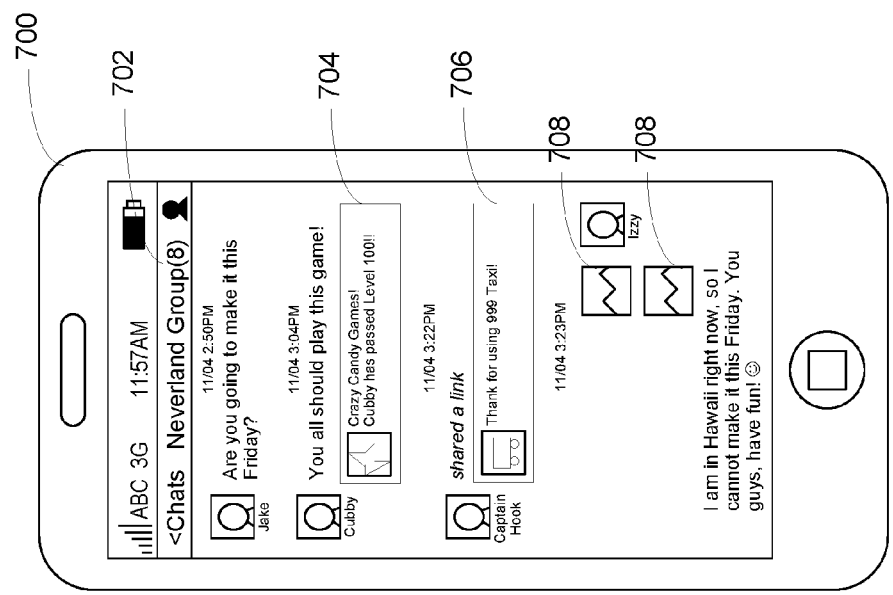

FIGS. 7A and 7B are two exemplary user interfaces 700 and 750 of a social network platform on which third party applications push information in accordance with some embodiments. The social network platform supports group conversations and blogs on user interfaces 700 and 750, respectively. A group conversation engages a subset of individual user accounts optionally by invitations. In accordance with user interface 700, the group conversation named "Neverland Group" 702 includes at least Jake, Cubby, Captain Hook and Izzy. During the conversation, Cubby shared information related to "Crazy Candy Games" 704 because he has recently played the game and passed level 100. Captain Hook shared information related to a Taxi service called "999 Tax" 706 because he has used the Taxi service recently. Izzy shared two pictures 708 associated with her vacation trip in Hawaii. Optionally, pictures 708 are forwarded from another website associated with Hawaii. Therefore, three third party applications (i.e., a game application, a Taxi service application and a picture application) are involved in this group conversation. Each of these third party applications shares information with registered users of the social network application on the group conversation interface via one of the registered users.

Further, in some embodiments, the social network platform includes a blog associated with each individual user account. In this example, user interface 750 displays what Jake sees on his blog review page. Captain Hook, Izzy, Cubby, Mr. Smee and Skully are connected to Jake as Jake's friends, and therefore, their blog posts and comments are displayed on user interface 750 for review by Jake. Cubby posted information related to "Crazy Candy Games" 704 on his own blog, because he has recently played the game and passed level 100. Captain Hook posted information related to a Taxi service called "999 Tax" 706 on his own blog, because he has used the Taxi service recently. Izzy shared five pictures 708 associated with her vacation trip in Hawaii. Optionally, pictures 708 are forwarded from another website associated with Hawaii. The information related to "Crazy Candy Games" 704, Taxi service 706 and pictures 708 is pushed to user interface 750 for Jake's review. Therefore, three third party applications (i.e., a game application, a Taxi service application and a picture application) are involved in this blog review page. As such, each of these third party applications shares information with registered users of the social network application on the blog review interface via one or more of the registered users.

In accordance with various embodiments of the present application, the server that manages the social network platform monitors the information sharing activities on various user interfaces by third party applications (i.e., a game application, a Taxi service application and a picture application). In many situations, each of the third party applications pushes information to the user accounts automatically without user intervention. For example, as soon as Captain Hook used the 999 Taxi service, the corresponding application automatically posts a link 706 on his blog or any group conversation Captain Hook is engaged in.

In some implementations, when a third party application is moved to a blacklist, it could push information to the user who has used the service associated with the third party application, but could not push information further to other users via the user. For example, when Captain Hook used the 999 Taxi service which has been moved to the blacklist, the corresponding application automatically posts a link 706 on his blog, but this blog is not displayed to his friends any more, nor is this blog displayed in any group conversation in which Captain Hook is engaged. When the third party application is moved to a list of prohibited applications, it is prohibited from posting links on any blogs or conversations even when a user uses service provided by the third party application.

Figure 8:
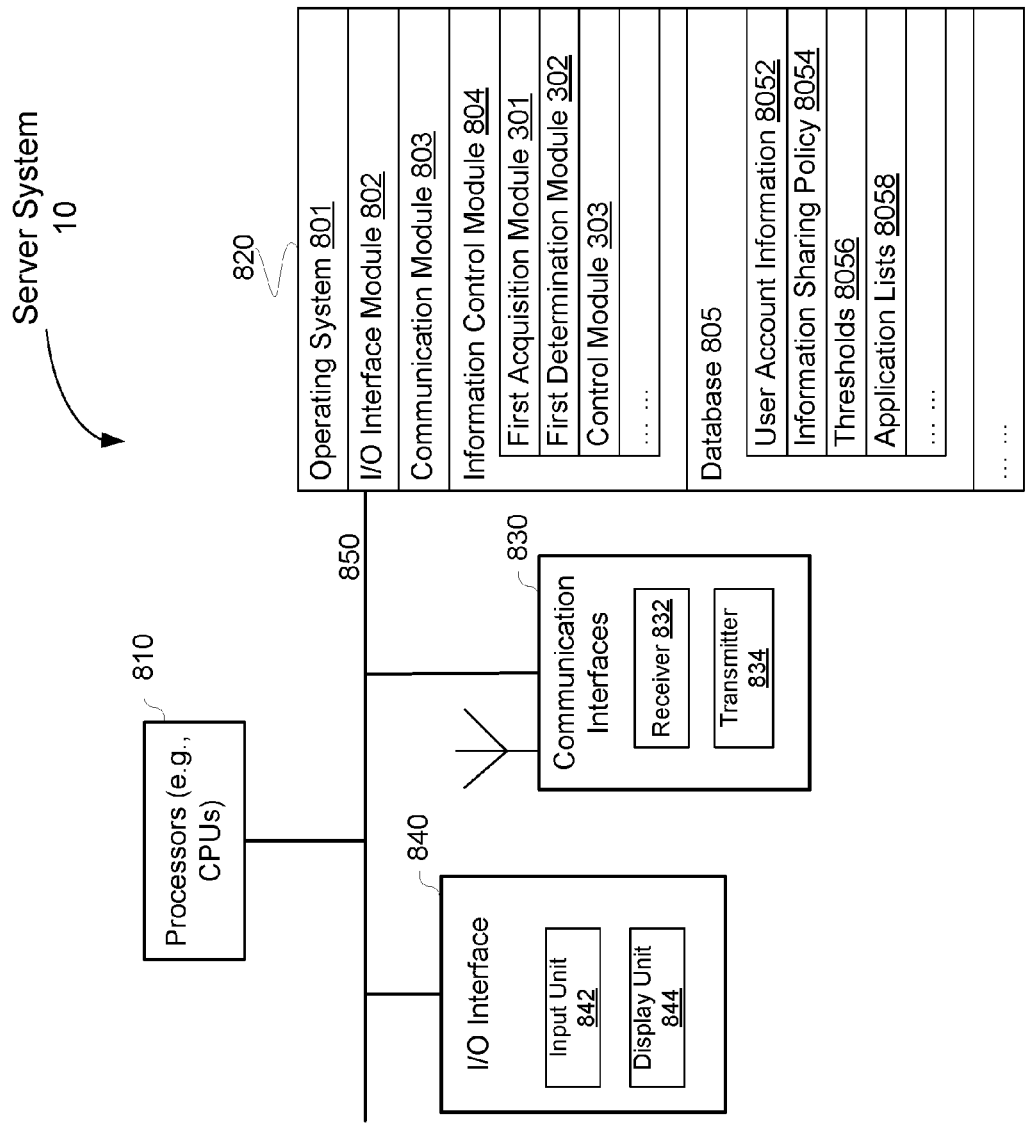
FIG. 8 is a block diagram of an exemplary server system that controls information shared on an open platform in accordance with some embodiments.

FIG. 8 is a block diagram of an exemplary server system that controls information shared on an open platform in accordance with some embodiments. In some implementations, server system 10 at least includes one or more processors 810 (e.g., central processing units) and a memory 820 for storing data, programs and instructions for execution by one or more processors 810. In some implementations, server system 10 further includes one or more communication interfaces 830, an input/output (I/O) interface 840, and one or more communication buses 850 that interconnect these components.

In some embodiments, I/O interface 840 includes an input unit 842 and a display unit 844. Examples of input unit 842 include a keyboard, a mouse, a touch pad, a game controller, a function key, a trackball, a joystick, a microphone, a camera and the like. Additionally, display unit 844 displays information that is inputted by the user or provided to the user for review. Examples of display unit 844 include, but are not limited to, a liquid crystal display (LCD) and an organic light-emitting diode (OLED) display. In some implementations, input unit 842 and display unit 844 are integrated on a touch-sensitive display that displays a graphical user interface (GUI).

In some embodiments, communication buses 530 include circuitry (sometimes called a chipset) that interconnects and controls communications between system components. In some embodiments, communication interfaces 830 further include a receiver 832 and a transmitter 834.

In some embodiments, memory 820 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 820 includes one or more storage devices remotely located from the one or more processors 810. In some embodiments, memory 820, or alternatively the non-volatile memory device(s) within memory 820, includes a non-transitory computer readable storage medium.

In some embodiments, memory 820 or alternatively the non-transitory computer readable storage medium of memory 820 stores the following programs, modules and data structures, instructions, or a subset thereof:

Operating System 801 that includes procedures for handling various basic system services and for performing hardware dependent tasks;

I/O interface module 802 that includes procedures for handling various basic input and output functions through one or more input and output devices, wherein I/O interface module 802 further includes an interface display module that controls displaying of a graphical user interface;

Communication module 803 that is used for connecting server system 10 to other computational devices (e.g., servers and client devices), via one or more network communication interfaces 850 (wired or wireless) and one or more communication networks, such as the Internet, other wide area networks, local area networks, metropolitan area networks, and so on;

Information Control Module 804 that includes at least first acquisition module 301, first determination module 302 and control module 303, and is used for controlling information sharing activities of one or more third party applications; and Database 805 that stores user account information 8052 associated with registered users of the open platform, an information sharing policy 8054 for restricting the one or more third party applications from sharing information on the open platform, a plurality of thresholds 8056, and a plurality of application lists 8058, where the thresholds include one or more of a first, second, third, fourth, fifth, sixth, seventh and eighth thresholds and a blacklist threshold as explained above with reference to FIGS. 1-4, and the application lists includes one or more of a white list, a secondary monitoring list, a default monitoring list, a grey list, a blacklist, and a list of prohibited applications as explained above with reference to FIGS. 2 and 4.

More details on functions of information control module 804 are explained above with reference to FIGS. 1-6, 7A and 7B.

Serial numbers in the embodiments of the present application are only used for describing, and do not represent priorities of the embodiments.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to determining", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon determining" or "in response to determining" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for controlling information items shared on an social network platform, comprising:

at a server having one or more processors and memory storing programs for execution by the processors:
monitoring information sharing activities by a public account of the social network platform, wherein the public account is supported by a third-party application authorized by the social network platform and has connection with a plurality of individual user accounts of the social network platform;
when the amount of information shared by the public account within a predetermined period of time exceeds a predefined threshold:
partitioning the shared information into multiple categories;
measuring user activities from the plurality of individual user accounts on the categorized shared information;
selecting a policy of restricting the public account from sharing information with the plurality of individual user accounts based on the measurement result; and
applying the policy to the public account.

2. The method of claim 1, wherein the social network platform includes an instant messaging application.

3. The method of claim 1, wherein the third party application is selected from a survey program, a game, a news service program, a music application, a customer service application, and an online shopping application.

4. The method of claim 1, wherein the social network platform includes a group conversation that engages a subset of individual user accounts, and the third party application shares information on the group conversation via at least a first user account in the subset of individual user accounts.

5. The method of claim 1, wherein the social network platform includes a blog associated with each individual user account, and the third party application shares information on a first blog via a corresponding user account or another user account owned by one of the blog owner's friends who has commented on the respective blog.

6. The method of claim 1, wherein the predefined threshold is defined according to one or more of the type of the shared information, the duration of time, a temporal trend of the amount of shared information, the type of the third party application, and the history of the third party application.

7. The method of claim 1, wherein the predefined threshold includes a first threshold, a second threshold and a third threshold that are associated with a website information category, a picture information category and an audio clip information category, respectively.

8. The method of claim 1, further comprising:
obtaining an information sharing curve that plots the amount of information shared by the public account at a plurality of shorter periods of time within the predetermined period of time; and
determines whether the information sharing curve indicates an abnormal fluctuation in the third party application's information sharing activity, wherein the policy of restricting the public account is selected and applied when the information sharing curve does not indicate any abnormal fluctuation in the third party application's information sharing activity.

9. The method of claim 8, further comprising:
determining whether the third party application has released a new version in the predetermined period of time, wherein it is determined that the information sharing curve does not indicate an abnormal fluctuation in the third party application's information sharing activity when the third party application has released a new version in the predetermined period of time.

10. The method of claim 1, wherein the amount of shared information is monitored for a first user account on the social network platform, and the information is shared by the third party application to the first user via a second user account.

11. The method of claim 1, wherein the policy is applied to the public account further in accordance with a determination that at least one of the predetermined conditions is satisfied, and the predetermined conditions include:
a first condition in which when the third party application is in a secondary monitoring list, the amount of the information shared by the third party application in the predetermined period of time on the open platform is not less than a fourth threshold that is distinct from the predefined threshold;
a second condition in which the number of users who receives more than n information items from the third party application within the predetermined period of time is not less than a fifth threshold, where n is a positive integer;
a third condition in which the number of times for which the third party application is reported for inappropriate information sharing activities is not less than a sixth threshold;
a fourth condition in which an average number of user responses for the information items shared by the third party application is not more than a seventh threshold; and
a fifth condition in which a ratio between the number of times for which the shared information items are clicked and the number of the information items shared by the third party application on the social network platform is not more than an eighth threshold.

12. The method of claim 1, wherein in accordance with the policy, the third party application is moved to a blacklist, and controlled to share information to a user who has implemented an operation on the third party application, but not to other users via this user.

13. The method of claim 1, wherein in accordance with the policy, the third party application is moved to a list of prohibited applications when it is determined that the third party application has been moved to the blacklist for an accumulative number of times that is equal to or greater than a blacklist threshold, and the third party application is prohibited from sharing information with any registered user on the social network application.

14. A server, comprising:
one or more processors; and
memory having instructions stored thereon, which when executed by the one or more processors cause the processors to perform operations, comprising:
monitoring information sharing activities by a public account of the social network platform, wherein the public account is supported by a third-party application authorized by the social network platform and has connection with a plurality of individual user accounts of the social network platform;
when the amount of information shared by the public account within a predetermined period of time exceeds a predefined threshold:
partitioning the shared information into multiple categories;
measuring user activities from the plurality of individual user accounts on the categorized shared information;
selecting a policy of restricting the public account from sharing information with the plurality of individual user accounts based on the measurement result; and
applying the policy to the public account.

15. The server of claim 14, wherein the third party application is selected from a survey program, a game, a news service program, a music application, a customer service application, and an online shopping application.

16. The server of claim 14, wherein the social network platform includes a group conversation that engages a subset of individual user accounts, and the third party application shares information on the group conversation via at least a first user account in the subset of individual user accounts.

17. The server of claim 14, wherein the social network platform includes a blog associated with each individual user account, and the third party application shares information on a first blog via a corresponding user account or another user account owned by one of the blog owner's friends who has commented on the respective blog.

18. The server of claim 14, wherein the predefined threshold is defined according to one or more of the type of the shared information, the duration of time, a temporal trend of the amount of shared information, the type of the third party application, and the history of the third party application.

19. The server of claim 14, wherein the predefined threshold includes a first threshold, a second threshold and a third threshold that are associated with a website information type, an picture information type and an audio clip information type, respectively.

20. A non-transitory computer-readable medium, having instructions stored thereon, which when executed by one or more processors cause the processors to perform operations comprising:
- monitoring information sharing activities by a public account of the social network platform, wherein the public account is supported by a third party application authorized by the social network platform and has connection with a plurality of individual user accounts of the social network platform;
- when the amount of information shared by the public account within a predetermined period of time exceeds a predefined threshold:
  - partitioning the shared information into multiple categories;
  - measuring user activities from the plurality of individual user accounts on the categorized shared information;
  - selecting a policy of restricting the public account from sharing information with the plurality of individual user accounts based on the measurement result; and
  - applying the policy to the public account.

* * * * *